United States Patent
Elke

(10) Patent No.: US 9,052,240 B2
(45) Date of Patent: Jun. 9, 2015

(54) INDUSTRIAL PROCESS TEMPERATURE TRANSMITTER WITH SENSOR STRESS DIAGNOSTICS

(75) Inventor: Anthony Michael Elke, Winsted, MN (US)

(73) Assignee: Rosemount Inc., Chanhassen, MN (US)

(*) Notice: Subject to any disclaimer, the term of this patent is extended or adjusted under 35 U.S.C. 154(b) by 155 days.

(21) Appl. No.: 13/537,532

(22) Filed: Jun. 29, 2012

(65) Prior Publication Data

US 2014/0003465 A1 Jan. 2, 2014

(51) Int. Cl.
| | |
|---|---|
| *G01K 15/00* | (2006.01) |
| *G01K 7/00* | (2006.01) |
| *G01K 13/00* | (2006.01) |
| *G01K 7/02* | (2006.01) |
| *G01K 7/18* | (2006.01) |
| *G01K 1/02* | (2006.01) |

(52) U.S. Cl.
CPC .. *G01K 7/02* (2013.01); *G01K 7/18* (2013.01); *G01K 1/022* (2013.01)

(58) Field of Classification Search
CPC .......... G01K 15/00; G01K 7/02; G01K 1/024
USPC ...................................... 374/1, 183, 179, 141
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,924,068 A | 12/1975 | Fletcher et al. | 375/333 |

(Continued)

FOREIGN PATENT DOCUMENTS

| | | |
|---|---|---|
| CA | 999950 | 11/1976 |
| CN | 1185841 | 6/1998 |

(Continued)

OTHER PUBLICATIONS

Summons to attend oral proceeding from the corresponding European Patent Application No. 07838659.6, dated Jan. 29, 2013.

(Continued)

*Primary Examiner* — Mirellys Jagan
(74) *Attorney, Agent, or Firm* — Westman, Champlin & Koehler, P.A.

(57) ABSTRACT

A temperature transmitter for sensing a temperature of an industrial process includes a temperature sensor arranged to provide a sensor output related to the temperature of the industrial process. Measurement circuitry is coupled to the temperature sensor and configured to determine the temperature of the industrial process based upon the sensor output. Output circuitry provides an output related to the measured temperature. A memory is configured to store temperature information related to excessive temperature events experienced by the temperature sensor. Diagnostic circuitry diagnoses a condition of the temperature sensor or other components based upon the stored temperature information.

20 Claims, 4 Drawing Sheets

(56) References Cited

U.S. PATENT DOCUMENTS

| | | | | |
|---|---|---|---|---|
| 3,948,098 | A | 4/1976 | Richardson et al. | 73/861.24 |
| 3,952,759 | A | 4/1976 | Ottenstein | 137/12 |
| 3,973,184 | A | 8/1976 | Raber | 324/51 |
| RE29,383 | E | 9/1977 | Gallatin et al. | 137/14 |
| 4,058,975 | A | 11/1977 | Gilbert et al. | 60/39.28 |
| 4,083,031 | A | 4/1978 | Pharo, Jr. | 367/135 |
| 4,099,413 | A | 7/1978 | Ohte et al. | 73/359 |
| 4,102,199 | A | 7/1978 | Talpouras | 73/362 |
| 4,122,719 | A | 10/1978 | Carlson et al. | 73/342 |
| 4,249,164 | A | 2/1981 | Tivy | 340/870.3 |
| 4,250,490 | A | 2/1981 | Dahlke | 340/870.37 |
| 4,255,964 | A | 3/1981 | Morison | 73/24.01 |
| 4,279,013 | A | 7/1981 | Dahlke | 340/870.37 |
| 4,337,516 | A | 6/1982 | Murphy et al. | 364/551 |
| 4,383,443 | A | 5/1983 | Langdon | 73/290 |
| 4,390,321 | A | 6/1983 | Langlois et al. | 417/15 |
| 4,399,824 | A | 8/1983 | Davidson | 128/736 |
| 4,417,312 | A | 11/1983 | Cronin et al. | 364/510 |
| 4,423,634 | A | 1/1984 | Audenard et al. | 73/587 |
| 4,446,741 | A | 5/1984 | Sirokorad et al. | 73/654 |
| 4,459,858 | A | 7/1984 | Marsh | 73/861.12 |
| 4,463,612 | A | 8/1984 | Thompson | 73/861.22 |
| 4,517,468 | A | 5/1985 | Kemper et al. | 290/52 |
| 4,528,869 | A | 7/1985 | Kubo et al. | 74/695 |
| 4,530,234 | A | 7/1985 | Cullick et al. | 73/53 |
| 4,536,753 | A | 8/1985 | Parker | 340/566 |
| 4,540,468 | A | 9/1985 | Genco et al. | 162/49 |
| 4,571,689 | A | 2/1986 | Hildebrand et al. | 364/481 |
| 4,630,265 | A | 12/1986 | Sexton | 370/85 |
| 4,635,214 | A | 1/1987 | Kasai et al. | 364/551 |
| 4,642,782 | A | 2/1987 | Kemper et al. | 364/550 |
| 4,644,479 | A | 2/1987 | Kemper et al. | 364/550 |
| 4,649,515 | A | 3/1987 | Thompson et al. | 364/900 |
| 4,668,473 | A | 5/1987 | Agarwal | 422/62 |
| 4,686,638 | A | 8/1987 | Furuse | 364/558 |
| 4,696,191 | A | 9/1987 | Claytor et al. | 73/600 |
| 4,705,212 | A | 11/1987 | Miller et al. | 236/54 |
| 4,707,796 | A | 11/1987 | Calabro et al. | 364/552 |
| 4,720,806 | A | 1/1988 | Schippers et al. | 364/551 |
| 4,736,367 | A | 4/1988 | Wroblewski et al. | 370/85 |
| 4,736,763 | A | 4/1988 | Britton et al. | 137/10 |
| 4,758,308 | A | 7/1988 | Carr | 162/263 |
| 4,777,585 | A | 10/1988 | Kokawa et al. | 364/164 |
| 4,807,151 | A | 2/1989 | Citron | 364/510 |
| 4,818,994 | A | 4/1989 | Orth et al. | 340/501 |
| 4,831,564 | A | 5/1989 | Suga | 364/551.01 |
| 4,833,922 | A | 5/1989 | Frick et al. | 73/756 |
| 4,841,286 | A | 6/1989 | Kummer | 340/653 |
| 4,853,693 | A | 8/1989 | Eaton-Williams | 340/588 |
| 4,866,628 | A | 9/1989 | Natarajan | 700/102 |
| 4,873,655 | A | 10/1989 | Kondraske | 364/553 |
| 4,907,167 | A | 3/1990 | Skeirik | 364/500 |
| 4,924,418 | A | 5/1990 | Bachman et al. | 364/550 |
| 4,926,364 | A | 5/1990 | Brotherton | 364/581 |
| 4,934,196 | A | 6/1990 | Romano | 73/861.38 |
| 4,939,753 | A | 7/1990 | Olson | 375/107 |
| 4,964,125 | A | 10/1990 | Kim | 371/15.1 |
| 4,988,990 | A | 1/1991 | Warrior | 340/25.5 |
| 4,992,965 | A | 2/1991 | Holter et al. | 364/551.01 |
| 5,005,142 | A | 4/1991 | Lipchak et al. | 364/550 |
| 5,019,760 | A | 5/1991 | Chu et al. | 318/490 |
| 5,025,344 | A | 6/1991 | Maly et al. | 361/88 |
| 5,043,862 | A | 8/1991 | Takahashi et al. | 364/162 |
| 5,047,990 | A | 9/1991 | Gafos et al. | 367/6 |
| 5,053,815 | A | 10/1991 | Wendell | 355/208 |
| 5,057,774 | A | 10/1991 | Verhelst et al. | 324/537 |
| 5,067,099 | A | 11/1991 | McCown et al. | 364/550 |
| 5,081,598 | A | 1/1992 | Bellows et al. | 364/550 |
| 5,089,979 | A | 2/1992 | McEachern et al. | 364/571.04 |
| 5,089,984 | A | 2/1992 | Struger et al. | 395/650 |
| 5,094,109 | A | 3/1992 | Dean et al. | 73/718 |
| 5,098,197 | A | 3/1992 | Shepard et al. | 374/120 |
| 5,099,436 | A | 3/1992 | McCown et al. | 364/550 |
| 5,103,409 | A | 4/1992 | Shimizu et al. | 364/556 |
| 5,111,531 | A | 5/1992 | Grayson et al. | 395/23 |
| 5,121,467 | A | 6/1992 | Skeirik | 395/11 |
| 5,122,794 | A | 6/1992 | Warrior | 340/825.2 |
| 5,122,976 | A | 6/1992 | Bellows et al. | 364/550 |
| 5,130,936 | A | 7/1992 | Sheppard et al. | 364/551.01 |
| 5,134,574 | A | 7/1992 | Beaverstock et al. | 364/551.01 |
| 5,137,370 | A | 8/1992 | McCulloch et al. | 374/173 |
| 5,142,612 | A | 8/1992 | Skeirik | 395/11 |
| 5,143,452 | A | 9/1992 | Maxedon et al. | 374/170 |
| 5,148,378 | A | 9/1992 | Shibayama et al. | 364/551.07 |
| 5,150,289 | A | 9/1992 | Badavas | 364/154 |
| 5,167,009 | A | 11/1992 | Skeirik | 395/27 |
| 5,175,678 | A | 12/1992 | Frerichs et al. | 364/148 |
| 5,193,143 | A | 3/1993 | Kaemmerer et al. | 395/51 |
| 5,195,098 | A | 3/1993 | Johnson et al. | 714/753 |
| 5,197,114 | A | 3/1993 | Skeirik | 395/22 |
| 5,197,328 | A | 3/1993 | Fitzgerald | 73/168 |
| 5,212,765 | A | 5/1993 | Skeirik | 395/11 |
| 5,214,582 | A | 5/1993 | Gray | 364/424.03 |
| 5,216,226 | A | 6/1993 | Miyoshi | 219/497 |
| 5,224,203 | A | 6/1993 | Skeirik | 395/22 |
| 5,228,780 | A | 7/1993 | Shepard et al. | 374/175 |
| 5,235,527 | A | 8/1993 | Ogawa et al. | 364/571.05 |
| 5,265,031 | A | 11/1993 | Malczewski | 364/497 |
| 5,265,222 | A | 11/1993 | Nishiya et al. | 395/3 |
| 5,267,241 | A | 11/1993 | Kowal | 714/706 |
| 5,269,311 | A | 12/1993 | Kirchner et al. | 128/672 |
| 5,274,572 | A | 12/1993 | O'Neill et al. | 364/550 |
| 5,282,131 | A | 1/1994 | Rudd et al. | 364/164 |
| 5,282,261 | A | 1/1994 | Skeirik | 395/22 |
| 5,293,585 | A | 3/1994 | Morita | 395/52 |
| 5,303,181 | A | 4/1994 | Stockton | 365/96 |
| 5,305,230 | A | 4/1994 | Matsumoto et al. | 364/495 |
| 5,311,421 | A | 5/1994 | Nomura et al. | 364/157 |
| 5,317,520 | A | 5/1994 | Castle | 364/482 |
| 5,327,357 | A | 7/1994 | Feinstein et al. | 364/502 |
| 5,333,240 | A | 7/1994 | Matsumoto et al. | 395/23 |
| 5,340,271 | A | 8/1994 | Freeman et al. | 415/1 |
| 5,347,843 | A | 9/1994 | Orr et al. | 73/3 |
| 5,349,541 | A | 9/1994 | Alexandro, Jr. et al. | 364/578 |
| 5,357,449 | A | 10/1994 | Oh | 364/551.01 |
| 5,361,628 | A | 11/1994 | Marko et al. | 73/116 |
| 5,365,423 | A | 11/1994 | Chand | 364/140 |
| 5,365,787 | A | 11/1994 | Hernandez et al. | 73/660 |
| 5,367,612 | A | 11/1994 | Bozich et al. | 395/22 |
| 5,369,674 | A | 11/1994 | Yokose et al. | 376/245 |
| 5,384,699 | A | 1/1995 | Levy et al. | 364/413.13 |
| 5,386,373 | A | 1/1995 | Keeler et al. | 364/577 |
| 5,388,465 | A | 2/1995 | Okaniwa et al. | 73/861.17 |
| 5,392,293 | A | 2/1995 | Hsue | 324/765 |
| 5,394,341 | A | 2/1995 | Kepner | 364/551.01 |
| 5,394,543 | A | 2/1995 | Hill et al. | 395/575 |
| 5,404,064 | A | 4/1995 | Mermelstein et al. | 310/319 |
| 5,408,406 | A | 4/1995 | Mathur et al. | 364/163 |
| 5,408,586 | A | 4/1995 | Skeirik | 395/23 |
| 5,410,495 | A | 4/1995 | Ramamurthi | 364/511.05 |
| 5,414,645 | A | 5/1995 | Hirano | 364/551.01 |
| 5,419,197 | A | 5/1995 | Ogi et al. | 73/659 |
| 5,430,642 | A | 7/1995 | Nakajima et al. | 364/148 |
| 5,434,774 | A | 7/1995 | Seberger | 364/172 |
| 5,436,705 | A | 7/1995 | Raj | 355/246 |
| 5,440,478 | A | 8/1995 | Fisher et al. | 364/188 |
| 5,442,639 | A | 8/1995 | Crowder et al. | 371/20.1 |
| 5,467,355 | A | 11/1995 | Umeda et al. | 364/571.04 |
| 5,469,070 | A | 11/1995 | Koluvek | 324/713 |
| 5,469,156 | A | 11/1995 | Kogura | 340/870.38 |
| 5,469,735 | A | 11/1995 | Watanabe | 73/118.1 |
| 5,469,749 | A | 11/1995 | Shimada et al. | 73/861.47 |
| 5,481,199 | A | 1/1996 | Anderson et al. | 324/705 |
| 5,481,200 | A | 1/1996 | Voegele et al. | 324/718 |
| 5,483,387 | A | 1/1996 | Bauhahn et al. | 359/885 |
| 5,485,753 | A | 1/1996 | Burns et al. | 73/720 |
| 5,486,996 | A | 1/1996 | Samad et al. | 364/152 |
| 5,488,697 | A | 1/1996 | Kaemmerer et al. | 395/51 |
| 5,489,831 | A | 2/1996 | Harris | 318/701 |
| 5,495,769 | A | 3/1996 | Broden et al. | 73/718 |
| 5,510,779 | A | 4/1996 | Maltby et al. | 340/870.3 |
| 5,511,004 | A | 4/1996 | Dubost et al. | 364/551.01 |
| 5,526,293 | A | 6/1996 | Mozumder et al. | 364/578 |
| 5,539,638 | A | 7/1996 | Keeler et al. | 364/424.03 |

(56) References Cited

U.S. PATENT DOCUMENTS

| | | | |
|---|---|---|---|
| 5,548,528 A | 8/1996 | Keeler et al. | 364/497 |
| 5,549,137 A | 8/1996 | Lenz et al. | 137/486 |
| 5,551,306 A | 9/1996 | Scarpa | 73/861.16 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,572,438 A | 11/1996 | Ehlers et al. | 700/295 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,650,943 A | 7/1997 | Powell et al. | 702/51 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,668,322 A | 9/1997 | Broden | 73/756 |
| 5,669,713 A * | 9/1997 | Schwartz et al. | 374/1 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,682,476 A | 10/1997 | Tapperson et al. | 370/225 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,734,975 A | 3/1998 | Zele et al. | 455/307 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,745,049 A * | 4/1998 | Akiyama et al. | 340/870.17 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,796,006 A | 8/1998 | Bellet et al. | 73/661 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,848,383 A | 12/1998 | Yunus | 702/102 |
| 5,854,993 A | 12/1998 | Crichnik | 702/54 |
| 5,854,994 A | 12/1998 | Canada et al. | 702/56 |
| 5,859,964 A | 1/1999 | Wang et al. | 395/185.01 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,900,801 A | 5/1999 | Heagle et al. | 340/286.09 |
| 5,908,990 A | 6/1999 | Cummings | 73/861.22 |
| 5,920,016 A | 7/1999 | Broden | 73/756 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,965,819 A | 10/1999 | Piety et al. | 73/660 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,041,287 A | 3/2000 | Dister et al. | 702/182 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,047,244 A | 4/2000 | Rud, Jr. | 702/98 |
| 6,052,655 A | 4/2000 | Kobayashi et al. | 702/184 |
| 6,059,254 A | 5/2000 | Sundet et al. | 248/678 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,298,454 B1 | 10/2001 | Schleiss et al. | 714/37 |
| 6,304,828 B1 | 10/2001 | Swanick et al. | 702/107 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyotsia et al. | 702/188 |
| 6,327,914 B1 | 12/2001 | Dutton | 73/861.356 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,497,222 B2 | 12/2002 | Bolz et al. | 123/476 |
| 6,505,517 B1 | 1/2003 | Eryurek et al. | 73/861.08 |
| 6,519,546 B1 | 2/2003 | Eryurek et al. | 702/130 |
| 6,530,259 B1 | 3/2003 | Kelly et al. | 73/23.2 |

(56) References Cited

U.S. PATENT DOCUMENTS

| | | | | |
|---|---|---|---|---|
| 6,532,392 B1 | 3/2003 | Eryurek et al. | | 700/54 |
| 6,539,267 B1 | 3/2003 | Eryurek et al. | | 700/51 |
| 6,546,814 B1 | 4/2003 | Choe et al. | | 73/862.08 |
| 6,556,145 B1 | 4/2003 | Kirkpatrick et al. | | 340/870.17 |
| 6,561,038 B2 | 5/2003 | Gravel et al. | | 73/729.2 |
| 6,564,268 B1 | 5/2003 | Davis et al. | | 710/11 |
| 6,567,006 B1 | 5/2003 | Lander et al. | | 340/605 |
| 6,594,603 B1 | 7/2003 | Eryurek et al. | | 702/104 |
| 6,597,997 B2 | 7/2003 | Tingley | | 702/34 |
| 6,601,005 B1 | 7/2003 | Eryurek et al. | | 702/104 |
| 6,611,775 B1 | 8/2003 | Coursolle et al. | | 702/65 |
| 6,614,271 B1 | 9/2003 | Jin et al. | | 327/77 |
| 6,615,149 B1 | 9/2003 | Wehrs | | 702/76 |
| 6,637,267 B2 | 10/2003 | Fiebelkorn et al. | | 73/587 |
| 6,654,697 B1 | 11/2003 | Eryurek et al. | | 702/47 |
| 6,662,120 B2 | 12/2003 | Drahm et al. | | 73/861.355 |
| 6,701,274 B1 | 3/2004 | Eryurek et al. | | 702/140 |
| 6,722,185 B2 | 4/2004 | Lawson et al. | | 73/40 |
| 6,727,812 B2 | 4/2004 | Sauler et al. | | 340/511 |
| 6,738,388 B1 | 5/2004 | Stevenson et al. | | 370/465 |
| 6,751,560 B1 | 6/2004 | Tingley et al. | | 702/51 |
| 6,754,601 B1 | 6/2004 | Eryurek et al. | | 702/104 |
| 6,758,168 B2 | 7/2004 | Koskinen et al. | | 122/7 |
| 6,859,755 B2 | 2/2005 | Eryurek et al. | | 702/183 |
| 6,904,476 B2 | 6/2005 | Hedtke | | 710/72 |
| 6,907,383 B2 | 6/2005 | Eryurek et al. | | 702/183 |
| 6,915,364 B1 | 7/2005 | Christensen et al. | | 710/104 |
| 6,970,003 B2 | 11/2005 | Rome et al. | | 324/718 |
| 6,976,503 B2 | 12/2005 | Ens et al. | | 137/552 |
| 6,993,445 B2 | 1/2006 | Clarke et al. | | 702/106 |
| 7,018,800 B2 | 3/2006 | Huisenga et al. | | 435/6 |
| 7,036,381 B2 | 5/2006 | Broden et al. | | 73/708 |
| 7,040,179 B2 | 5/2006 | Drahm et al. | | 73/861.356 |
| 7,058,542 B2 | 6/2006 | Hauhia et al. | | 702/183 |
| 7,085,610 B2 | 8/2006 | Eryurek et al. | | 700/29 |
| 7,099,852 B2 | 8/2006 | Unsworth et al. | | 706/24 |
| 7,109,883 B2 | 9/2006 | Trimble et al. | | 340/870.16 |
| 7,114,516 B2 | 10/2006 | Ito | | 137/487.5 |
| 7,171,281 B2 | 1/2007 | Weber et al. | | 700/96 |
| 7,254,518 B2 | 8/2007 | Eryurek et al. | | 702/183 |
| 7,258,021 B2 | 8/2007 | Broden | | 73/756 |
| 7,406,387 B2 | 7/2008 | Hashizume et al. | | |
| 7,435,581 B2 | 10/2008 | West | | 435/289.1 |
| 7,528,737 B2 | 5/2009 | Hedtke | | 340/870.01 |
| 7,577,543 B2 | 8/2009 | Brahmajosyula et al. | | |
| 7,680,549 B2 | 3/2010 | Kavaklioglu et al. | | |
| 7,766,541 B2 | 8/2010 | Sato | | |
| 7,821,437 B1 | 10/2010 | Rud et al. | | 341/123 |
| 7,827,988 B2 | 11/2010 | Matthews et al. | | 128/204.21 |
| 8,311,778 B2 | 11/2012 | Bronczyk et al. | | 702/188 |
| 2002/0013629 A1 | 1/2002 | Nixon et al. | | |
| 2002/0029808 A1 | 3/2002 | Friend et al. | | 137/551 |
| 2002/0032544 A1 | 3/2002 | Reid et al. | | 702/183 |
| 2002/0077711 A1 | 6/2002 | Nixon et al. | | 700/19 |
| 2002/0121910 A1 | 9/2002 | Rome et al. | | 324/718 |
| 2002/0145568 A1 | 10/2002 | Winter | | 343/701 |
| 2002/0148644 A1 | 10/2002 | Schultz et al. | | 175/39 |
| 2002/0194547 A1 | 12/2002 | Christensen et al. | | 714/43 |
| 2003/0014536 A1 | 1/2003 | Christensen et al. | | 709/238 |
| 2003/0033040 A1 | 2/2003 | Billings | | 700/97 |
| 2003/0045962 A1 | 3/2003 | Eryurek et al. | | 700/128 |
| 2004/0064203 A1 | 4/2004 | Bornside et al. | | 700/78 |
| 2004/0128034 A1 | 7/2004 | Lenker et al. | | 700/282 |
| 2004/0199361 A1 | 10/2004 | Lu et al. | | 702/183 |
| 2004/0249583 A1 | 12/2004 | Eryurek et al. | | 702/47 |
| 2005/0011278 A1 | 1/2005 | Brown et al. | | 73/861.18 |
| 2005/0072239 A1 | 4/2005 | Longsdorf et al. | | 73/649 |
| 2005/0117614 A1 | 6/2005 | Xu et al. | | 372/18 |
| 2005/0132808 A1 | 6/2005 | Brown et al. | | |
| 2005/0168343 A1 | 8/2005 | Longsdorf et al. | | 340/664 |
| 2005/0284237 A1 | 12/2005 | Henry et al. | | 73/861.356 |
| 2006/0075009 A1 | 4/2006 | Lenz et al. | | 708/160 |
| 2006/0277000 A1 | 12/2006 | Wehrs | | 702/183 |
| 2007/0010967 A1 | 1/2007 | Scherr | | 702/182 |
| 2007/0010968 A1 | 1/2007 | Longsdorf et al. | | 702/183 |
| 2008/0033693 A1 | 2/2008 | Andenna et al. | | |
| 2008/0082294 A1 | 4/2008 | Pihlaja et al. | | 702/179 |
| 2008/0103629 A1 | 5/2008 | Milanovic et al. | | |
| 2008/0110459 A1 | 5/2008 | Farbarik | | 128/204.18 |
| 2008/0208538 A1 | 8/2008 | Visser et al. | | 702/190 |
| 2009/0121790 A1 | 5/2009 | Brown et al. | | 330/279 |
| 2009/0309574 A1 | 12/2009 | Goupil et al. | | |
| 2010/0011869 A1 | 1/2010 | Klosinski | | |
| 2010/0177800 A1 | 7/2010 | Rud et al. | | |
| 2011/0299567 A1 | 12/2011 | Rud et al. | | |
| 2012/0041704 A1 | 2/2012 | Rovner et al. | | 702/100 |
| 2012/0051399 A1 | 3/2012 | Rud et al. | | 374/185 |
| 2012/0245895 A1 | 9/2012 | Rud | | |
| 2013/0046490 A1 | 2/2013 | Arntson et al. | | |

FOREIGN PATENT DOCUMENTS

| | | |
|---|---|---|
| CN | 1346435 | 4/2002 |
| CN | 101206146 | 6/2008 |
| DE | 32 13 866 A1 | 10/1983 |
| DE | 35 03 597 | 7/1986 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 511 553 | 4/1992 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 022 626 A2 | 10/1997 |
| EP | 0 807 804 A2 | 11/1997 |
| EP | 0 827 096 | 3/1998 |
| EP | 1 058 093 A1 | 5/1999 |
| EP | 0 335 957 B1 | 11/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-080535 | 4/1987 |
| JP | 62-50901 | 9/1987 |
| JP | 63-169532 | 7/1988 |

(56) References Cited

FOREIGN PATENT DOCUMENTS

| | | |
|---|---|---|
| JP | 64-01914 | 1/1989 |
| JP | 64-72699 | 3/1989 |
| JP | 11-87430 | 7/1989 |
| JP | 2-05105 | 1/1990 |
| JP | 3-118424 | 5/1991 |
| JP | 3-229124 | 10/1991 |
| JP | 4-70906 | 3/1992 |
| JP | 05-60596 | 3/1993 |
| JP | 5-122768 | 5/1993 |
| JP | 5-164781 | 6/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 9054611 | 2/1997 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 11-505922 | 5/1999 |
| JP | 3139597 | 12/2000 |
| JP | 2001-501754 | 2/2001 |
| JP | 2002-538420 U | 11/2002 |
| JP | 2003-503784 | 1/2003 |
| JP | 2004021712 | 1/2004 |
| JP | 2004034112 | 2/2004 |
| JP | 2004-186445 | 7/2004 |
| JP | 09/005092 | 2/2007 |
| JP | 2007-040763 | 2/2007 |
| JP | 2007-507712 | 3/2007 |
| JP | 2008-513879 | 5/2008 |
| RU | 2190267 C2 | 9/2002 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |
| WO | WO 2005/033639 | 4/2005 |
| WO | WO 2008/039993 | 4/2008 |

OTHER PUBLICATIONS

Reexamination Notification from Chinese Application No. 2007800357356, dated May 3, 2013.
Decision of rejection from Japanese patent application No. 2009530377, dated Apr. 30, 2013.
Decision of Rejection from corresponding European patent application No. 07838659.6 dated Jul. 3, 2013.
"Notification of Transmittal of the International Search Report and the Written Opinion of the International Searching Authority, or the Declaration" for PCT/US2008/009394 filed Aug. 5, 2008; 13 pages.
Office Action from Japanese Application No. 2010-519967, dated Aug. 9, 2012.
Eryurek et al., "Advanced Diagnostics Achieved with Intelligent Sensors and Fieldbus", 2001, Measuremnet and Control vol. 34, p. 293-311.
Canadian Office Action for Canadian App. No. 2,694,936, dated Oct. 16, 2012.
"Experimental and Numerical Investigation of Turbulent Flow Induced Pipe Vibration in Fully Developed Flow", by Pittard et al., Jul. 2004, Review of Scientific Instruments, vol. 75, No. 7, pp. 2393-2401.
"Wireless Sensing of Flow-Induced Vibrations for Pipeline Integrity Monitoring", by Awawdeh et al., 2006, IEEE, pp. 114-117.
Notification of Transmittal of the International Search Report and the Written Opinion of the International Searching Authority, or the Declaration in related PCT Application No. PCT/US2013/044144, dated Apr. 1, 2014.
Notification of Transmittal of the International Search Report and the Written Opinion of the International Searching Authority, or the Declaration in related PCT Application No. PCT/US2013/061170, filed Sep. 23, 2013, 9 pgs.
"Notification of Transmittal of the International Search Report and the Written Opinion of the International Searching Authority", or the Declaration for PCT/US2012/055733, dated Jul. 3, 2013.
"Basics of Vibration Monitoring for Fault Detection and Process Control", by Reimche et al., Jun. 2-6, 2003, PANANDT 2003, Rio de Janeiro, Brasil, 10 pgs.
"The Effect of Change in Flow Rate on the Vibration of Double-Suction Centrifugal Pumps", by Hodkiewicz et al., 2002, Proceedings of the Institution of Mechanical Engineers, Part E: Journal of Process Mechanical Engineering, vol. 216, pp. 47-58.
Communication pursuant to Rules 161(1) and 162 EPC for European Patent Application No. 12780913.5-1557, dated May 22, 2014, 2 pages.
Official Action from Chinese Patent Application No. 201110303797.9, dated Apr. 22, 2014.
"Notification of Transmittal of the International Search Report and the Written Opinion of the International Searching Authority", or the Declaration for PCT/US027409, dated Oct. 17, 2012.
Communication regarding EP Application No. 12713813.9-1802, dated Nov. 8, 2013.
Office Action from Japanese Application No. 2014-501087, dated Aug. 5, 2014.
U.S. Appl. No. 09/257,896, filed Feb. 25, 1999, Eryurek et al.
"A TCP\IP Tutorial" by, Socolofsky et al., Spider Systems Limited, Jan. 1991 pp. 1-23.
"Approval Standards for Explosionproof Electrical Equipment General Requirements", Factory Mutual Research, Cl. No. 3615, Mar. 1989, pp. 1-34.
"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor for Piezoresistive Sensors" MCA Technologies Inc. (MCA7707), pp. 1-8, prior to Jan. 2009.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50. Feb. 1992, pp. 1-93.

(56) References Cited

OTHER PUBLICATIONS

"Fieldbus Standard for Use in Industrial Control Systems Part 3: Data Link Service Definition", ISA-S50. Feb. 1997, Part 3, Aug. 1997, pp. 1-159.

Fieldbus Standard for Use in Industrial Control Systems Part 4: Data Link Protocol Specification, ISA-550. Feb. 1997, Part 4, Aug. 1997, pp. 1-481.

"Fieldbus Support for Process Analysis" by, Blevins et al., Fisher-Rosemount Systems, Inc., 1995, pp. 121-128.

"Fieldbus Technical Overview Understanding Foundation™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Technology Adoption into Automation" by, Fondl et al., Automation Business, pp. 1-5, prior to Jan. 2009.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There A Future For Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI and Browser for Embedded Web Devices" by, Tom Williams, pp. 1-2, prior to Jan. 2009.

"PC Software Gets Its Edge From Windows, Components, and the Internet", Wayne Labs, I&Cs, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.-Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*, prior to Jan. 2009.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*, no date.

"Smart Temperature Measurement in the '90s", by T. Kerlin et al., *C&I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4, prior to Jan. 2009.

"Application of Neural Computing Paradigms for Signal Validation," by B.R. Upadhyaya et al., *Department of Nuclear Engineering*, pp. 1-18, prior to Jan. 2009.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600°C", by M.J. de Groot et al., *CAL LAB*, Jul./Aug. 1996, pp. 38-41.

"Survey, Applications, and Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&Cs*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&Cs*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12. 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms for Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

(56) References Cited

OTHER PUBLICATIONS

"Fuzzy Logic and Artificial Neural Networks for Nuclear Power Plant Applications," by R.C. Berkan et al., *Proceedings of the American Power Conference*, no date.

"Fuzzy Logic and Neural Network Applications to Fault Diagnosis", by P. Frank et al., *International Journal of Approximate Reasoning*, (1997), pp. 68-88.

"Keynote Paper: Hardware Compilation—A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6$^{Th}$ WWW Conference Workshop on Embedded Web Technology, Santa Clara, CA (Apr. 7, 1997).

Microsoft Press Computer Dictionary, 3$^{rd}$ Edition, p. 124, prior to Jan. 2009.

"Internal Statistical Quality Control for Quality Monitoring Instruments", by P. Girling et al., *ISA*, 15 pgs., 1999.

Web Pages from www.triant.com (3 pgs.), prior to Jan. 2009.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermometry," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele and Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of an Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

(56) References Cited

OTHER PUBLICATIONS

International Search Report from Application No. PCT/US02/06606 with international filing date of Mar. 5, 2002.
International Search Report from Application No. PCT/US02/30465 with international filing date of Sep. 25, 2002.
Communication from European patent application No. 07838659.6 dated Jun. 24, 2010.
"What is a weighted moving average?", *Dau Stat Refresher*, http://cne.gmu.edu/modules/dau/stat/mvavgs/wma_bdy.html. (1995).
"Statistics Glossary: Time Series Data", by Easton et al., http://www.stats.gla.ac.uk/steps/glossary/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
U.S. Appl. No. 10/675,014, filed Sep. 2003, Longsdorf et al.
U.S. Appl. No. 10/744,809, filed Dec. 2003, Brown et al.
"Notification of Transmittal of the International Search Report and the Written Opinion of the International Searching Authority", or the Declaration for PCT/US2004/017300.
U.S. Appl. No. 10/893,144, filed Jul. 2004, Brown et al.
"Invitation to Pay Additional Fees" for PCT/US2004/031678.
"Notification of Transmittal of The International Search Report or the Declaration", PCT/US2004/025291.
"Notification of Transmittal of The International Search Report or the Declaration", PCT/US2004/031678.
"Notification of Transmittal of the International Search Report or the Declaration", PCT/US2005/011385.
"Notification of Transmittal of the International Preliminary Report on Patenatability", PCT/US2004/031678.
"Notification of Transmittal of International Search Report and the Written Opinion", PCT/US2004/022736.
"Notification of Transmittal of the International Search Report", PCT/US00/14798.
"Notification of Transmittal of International Search Report and the Written Opinion", PCT/US2006/037535.
"Notification of Transmittal of International Search Report and the Written Opinion", PCT/US2007/012317.
Samson, Technical Information; HART Communication, Part 4 Communications; 40 pp., no date.
"A Supervision Support System for Industrial Processes" by J. Penalva et al., IEEE, Oct. 1993, pp. 57-65.
"International Search Report" for related Application No. PCT/US2007/017301.
"Written Opinion" for related Application No. PCT/US2007/017301.
Office Action from Chinese Application No. 200780030039.6, dated Dec. 1, 2010.
Office Action from European Application No. 07836452.8, dated Jun. 6, 2011.
Office Action from corresponding Japanese Application No. 2009/524611, dated Jul. 26, 2011, 7 pgs.
Office Action from Japanese Application No. 2010-519967, dated Feb. 7, 2012.
Rejection Decision from the corresponding Chinese patent application No. 2007800357356 dated Mar. 28, 2012.
Second Office Action from the corresponding Japanese patent application No. 2009530377 dated May 22, 2012.
Office Action from Chinese Patent Application No. 201210335726.1, dated Feb. 28, 2015.

* cited by examiner

INDUSTRIAL PROCESS TEMPERATURE TRANSMITTER WITH SENSOR STRESS DIAGNOSTICS

BACKGROUND

The present invention relates to industrial process control or monitoring systems of the type used to control or monitor an industrial process. More specifically, the present invention relates to temperature transmitters which are used to sense a temperature of the industrial process.

Process variable transmitters are used to measure process parameters in a process control or monitoring system. Temperature transmitters typically include a sensor, an analog-to-digital converter for converting an output from the sensor into a digital format, a microprocessor for compensating the digitized output and an output circuit for transmitting the compensated output. Typically, this transmission is over a process control loop, such as a 4-20 mA current loop. One example parameter is temperature which can be sensed by measuring the resistance of an RTD (Resistive Temperature Device), also called a PRT (Platinum Resistance Thermometer) sensor, or a voltage output of a thermocouple sensor.

As the temperature sensor in the process variable transmitter ages, its accuracy may tend to degrade especially if the sensor experiences excessive temperatures above or below the standard temperature range of the sensor. This degradation may lead to a complete failure in which the sensor or the transmitter itself needs to be replaced. Further, the degradation may result in errors in the temperature readings. This may go unnoticed and lead to inaccuracies in the monitoring or control of the industrial process.

SUMMARY

A temperature transmitter for sensing a temperature of an industrial process includes a temperature sensor arranged to provide a sensor output related to the temperature of the industrial process. Measurement circuitry is coupled to the temperature sensor and configured to determine the temperature of the industrial process based upon the sensor output. Output circuitry provides an output related to the measured temperature. A memory is configured to store temperature information related to excessive temperature events experienced by the temperature sensor. Diagnostic circuitry diagnoses a condition of the temperature sensor or other components based upon the stored temperature information.

DETAILED DESCRIPTION OF ILLUSTRATIVE EMBODIMENTS

As discussed in the Background section, over time the temperature sensor of a temperature transmitter may age and degrade. This can lead to inaccuracies in the temperature measurements as well as an ultimate failure in the sensor. It has been discovered that one source of this degradation is due to exposure of the temperature sensor to excessive temperatures causing damage to the sensor. For example, the sensor may be exposed to a temperature that exceeds the limits of a material used to construct the sensor. The excessive temperature may be a high excessive temperature or a low excessive temperature.

The present invention monitors the number of excessive temperature events experienced by a temperature sensor in a process variable transmitter. Based upon this information, diagnostics can be performed and a determination made regarding the possibility of degradation of the sensor. The monitoring of excessive temperatures can be the number of excessive temperature events that the sensor has experienced, the duration of the excessive temperature event, and/or the temperature during the excessive temperature event. This information can be stored in a memory of the process variable transmitter or stored in a memory associated with the temperature sensor itself.

Figure 1:
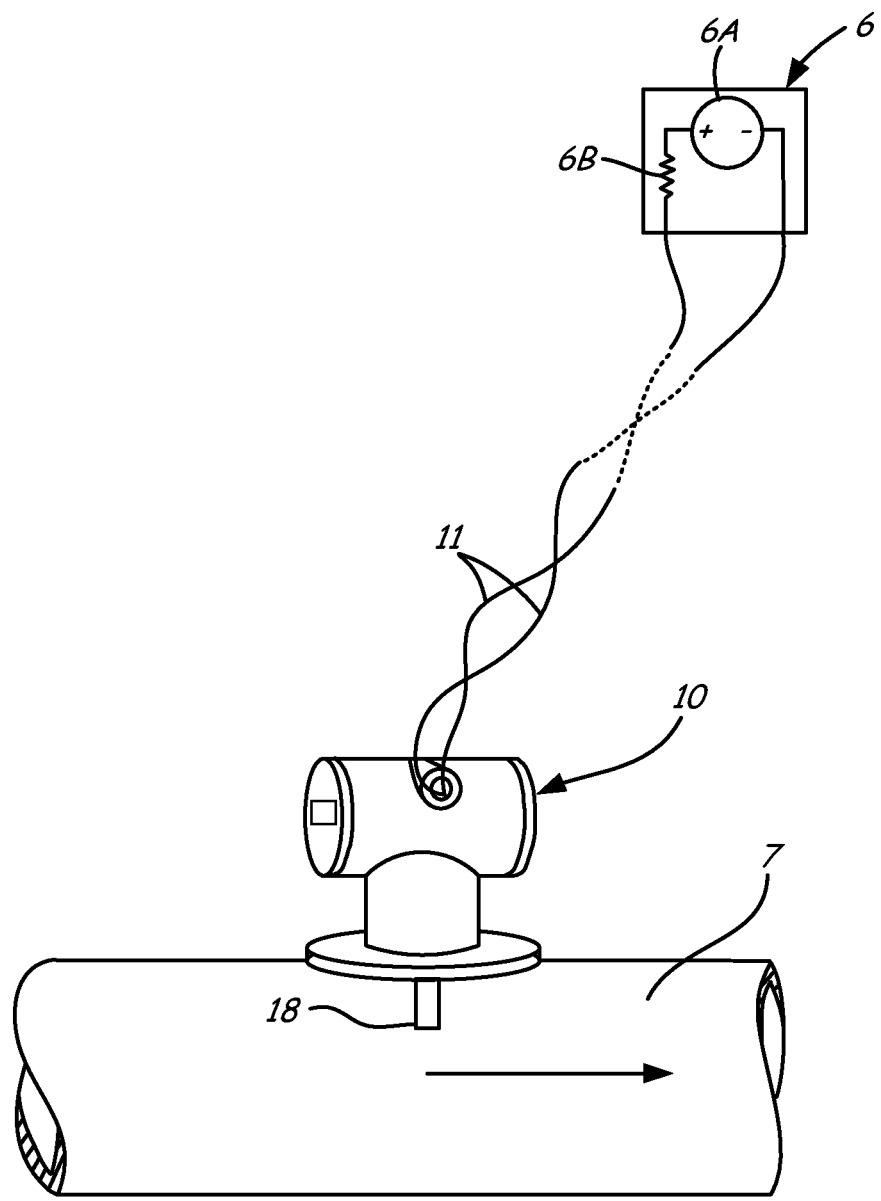
FIG. 1 is a simplified diagram showing an industrial process control system including a temperature sensor configured to sense a temperature of a process fluid.

FIG. 1 is a simplified diagram of an industrial process control system 5. In FIG. 1, process piping 7 carries a process fluid. A process variable transmitter 10 is configured to couple to the process piping 7. Transmitter 10 includes a temperature sensor 18 which can comprise, for example, a thermocouple or RTD sensor. Transmitter 10 is configured to transmit information to another location such a process control room 6. The transmission can be over a process control loop, such as a two wire process control loop 11. The process control loop can be in accordance with any desired format including, for example, a 4-20 mA process control loop, a process control loop which carries digital communications, a wireless process control loop, etc. In the example shown in FIG. 1, the process variable is powered by a power supply 6A at control room 6. This power is received over the process control loop 11. A sense resistor 6B can be used to sense the current flowing through loop 11 and thereby monitor temperature related information sent by transmitter 10. It is appreciated that other methods of powering the sensor and communicating the sensor information may be used.

Figure 2A:
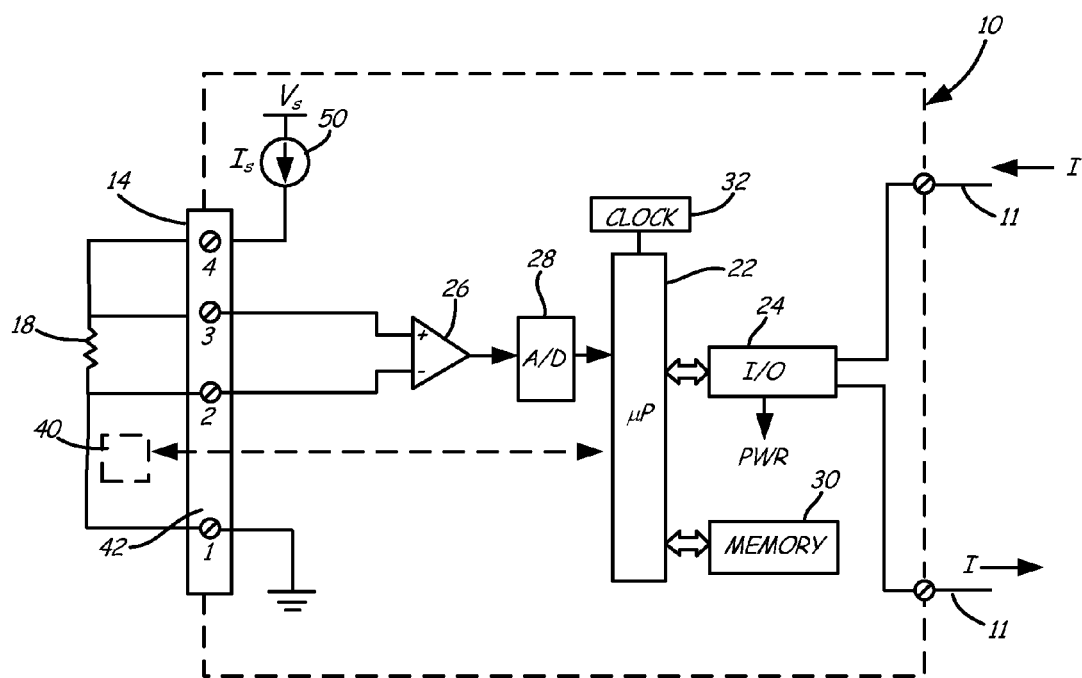
FIG. 2A is a block diagram of a temperature transmitter connected to measure temperature with an RTD sensor.

FIG. 2A is a block diagram of temperature transmitter 10 connected to measure temperature with an RTD sensor 18. Transmitter 10 couples to process control loop 11 which provides power to transmitter 10 and over which information is transmitted and received. Transmitter 10 includes terminal block 14 having terminals 1 through 4 for coupling to a sensor 18 which can be, for example, an RTD temperature sensor (shown in FIG. 2A) or a thermocouple temperature sensor (shown in FIG. 2B). Sensor 18 can be either internal or external to transmitter 10. Transmitter 10 includes microprocessor 22 which is coupled to control loop 11 through input/output (I/O) circuitry 24. Circuitry 24 also powers the transmitter 10 with power from loop 11. A current source 50 applies current $I_S$ to sensor 18. Positive and negative inputs of differential amplifier 26 connect to sensor 18 and provides an output to high accuracy A/D converter 28. Memory 30 stores instructions and information for microprocessor 22, which operates at a speed determined by clock 32.

In operation, transmitter 10 measures the temperature of sensor 18 and transmits a representation of temperature over control loop 11. Transmitter 10 employs the following equation to compute the resistance value of temperature of sensor 18:

$$R_{INPUT} = \frac{V_{RINPUT}}{I_S} \qquad \text{EQ. 1}$$

where:

Current source 50 provides current $I_S$ through sensor 18 via terminals 1 and 4. Microprocessor 22 measures the voltage drop ($V_{RINPUT}$) across RTD 18 between terminals 2 and 3. In a four-wire resistance measurement such as this, the voltage drop across the connections to terminals 2 and 3 is largely eliminated, since substantially all the current flows between terminals 1 and 4, and has little impact on the accuracy of the measurement. $R_{INPUT}$ is converted to temperature units with a look-up table or suitable equation stored in memory 30.

Figure 2B:
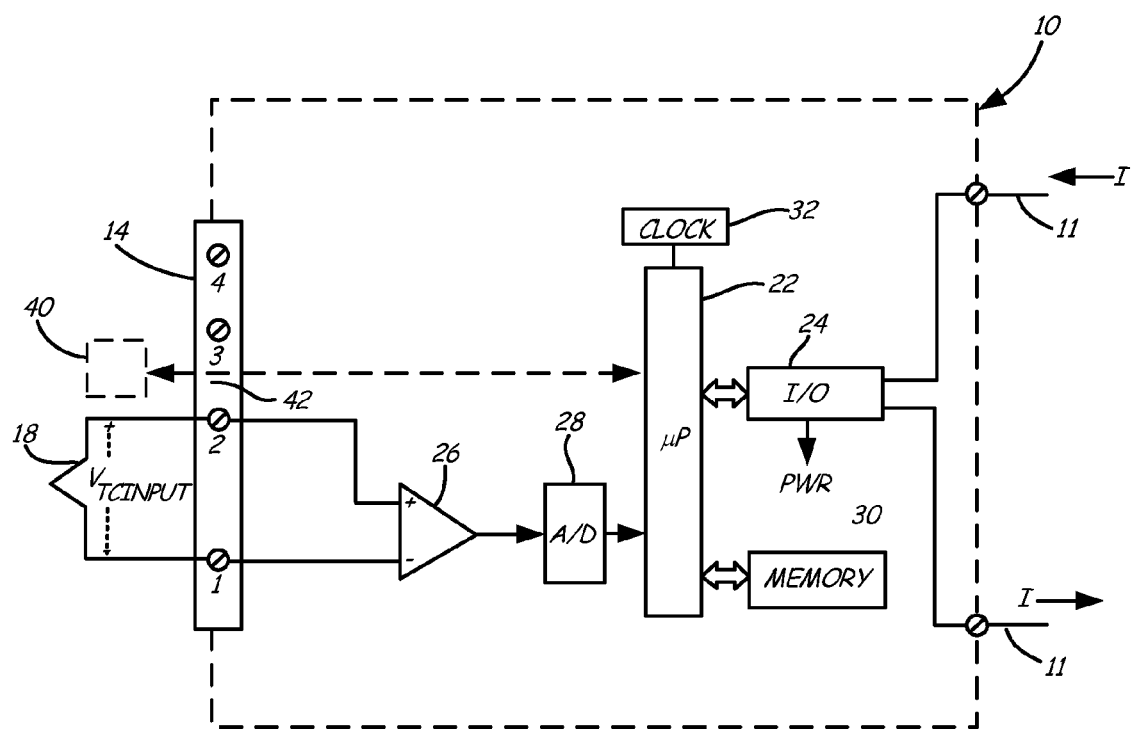
FIG. 2B is a block diagram of a temperature transmitter connected to measure temperature with the thermocouple sensor.

FIG. 2B shows transmitter 10 connected to measure temperature with a thermocouple for the sensor 18 which creates a voltage $V_{TCINPUT}$ across terminals 1 and 2. Terminals 1 and 2 couple to inputs of differential amplifier 26. Transmitter 10 measures the temperature of thermocouple sensor 18 by determining the thermocouple voltage $V_{TCINPUT}$. This voltage is compensated as appropriate and converted into a representation of temperature based upon a lookup table, equation, or the like stored in, for example, memory 30. Temperature information can then be transmitted on control loop 11 as described above.

In addition to memory 30 illustrated in FIGS. 2A and 2B, optional sensor memory 40 is also shown. Optional sensor memory 40 can be physically associated with the sensor 18 and connected to microprocessor 22 through memory connector 42 in terminal block 14. In another example embodiment, memory 40 includes circuitry for coupling to the terminals of terminal block 14. In either configuration, information stored in memory 40 can be read by microprocessor 22. Similarly, microprocessor 22 can write information to memory 40. In configurations where memory 40 communicates with microprocessor 22 through terminal block connectors 1-4, the memory 40 can include circuitry to, for example, be responsive to a high frequency signal or a digital signal modulated onto terminals of terminal block 14. In response to such a signal, the memory 40 can store information from microprocessor 22 or send information to microprocessor 22.

During operation, microprocessor 22 monitors the temperature of temperature sensor 18. If the temperature of temperature sensor 18 exceeds a threshold, information can be stored in memory 30 and/or memory 40. As used herein, a "excessive temperature event" refers to the sensor 18 experiencing a temperature which exceeds a threshold. This threshold may be an absolute threshold, or may be a threshold based upon both temperature and duration of time. For example, if the sensed temperature exceeds a threshold value, a counter within memory 30/40 can be incremented. This incrementation can also be related to a duration during which the temperature is greater than the threshold. In another example embodiment, the measured temperature is subtracted from a nominal value and the result is integrated with respect to time. For example, the duration during which the sensor 18 is at higher temperature can be given a greater weight than lower temperatures. As a specific example, an occurrence of the temperature sensor 18 momentarily exceeding 500° C. can be given as much weight as the temperature sensor 18 experiencing a temperature of 200° C. for 10 hours. This can be adjusted as desired. For example, some components may fail instantaneously at high temperatures whereas some components may simply tend to degrade more rapidly when exposed to an elevated temperature which is less than a temperature which would cause immediate failure.

Based upon the information stored in memory 30/40 related to excessive temperature events, the microprocessor 22 can diagnose the condition of the sensor 18. This diagnostic can be in the form of providing an output related to a predicted remaining life, an indication that he sensor 18 needs to be replaced immediately, or used to compensate for errors introduced in the temperature measurements due to the excessive temperature events. The excessive temperature information may also be used to predict errors in the temperature measurements due to excessive temperature events. Such information can be determined by characterizing a temperature sensor as it experiences excessive temperature events and storing this information in the form compensation information in memory 30 or 40.

In some configurations, the temperature sensor 18 is removable. Optional memory 40 can be, for example, a non-volatile memory which is capable of retaining information without a separate power source. Such a configuration may be desirable because the excessive temperature event information is retained within sensor 18 itself. If the sensor 18 is removed and used with a different transmitter 10, the excessive temperature event information will be available to the new transmitter. Further, the information can be used for failure analysis if the sensor is returned by a user because it has failed. The information stored in the memory 30 or 40 may also contain information related to when the excessive temperature events occurred, for example time and date information. In another example configuration, the particular threshold information can also be stored in the memory 30 or 40 either during manufacture, commissioning or based upon a user input. The user input may be through a local interface or received through process control loop 11. Memory 30 or 40 may also contain other information such as other process variables, for example, vibrations experienced by the sensor 18.

Figure 3:
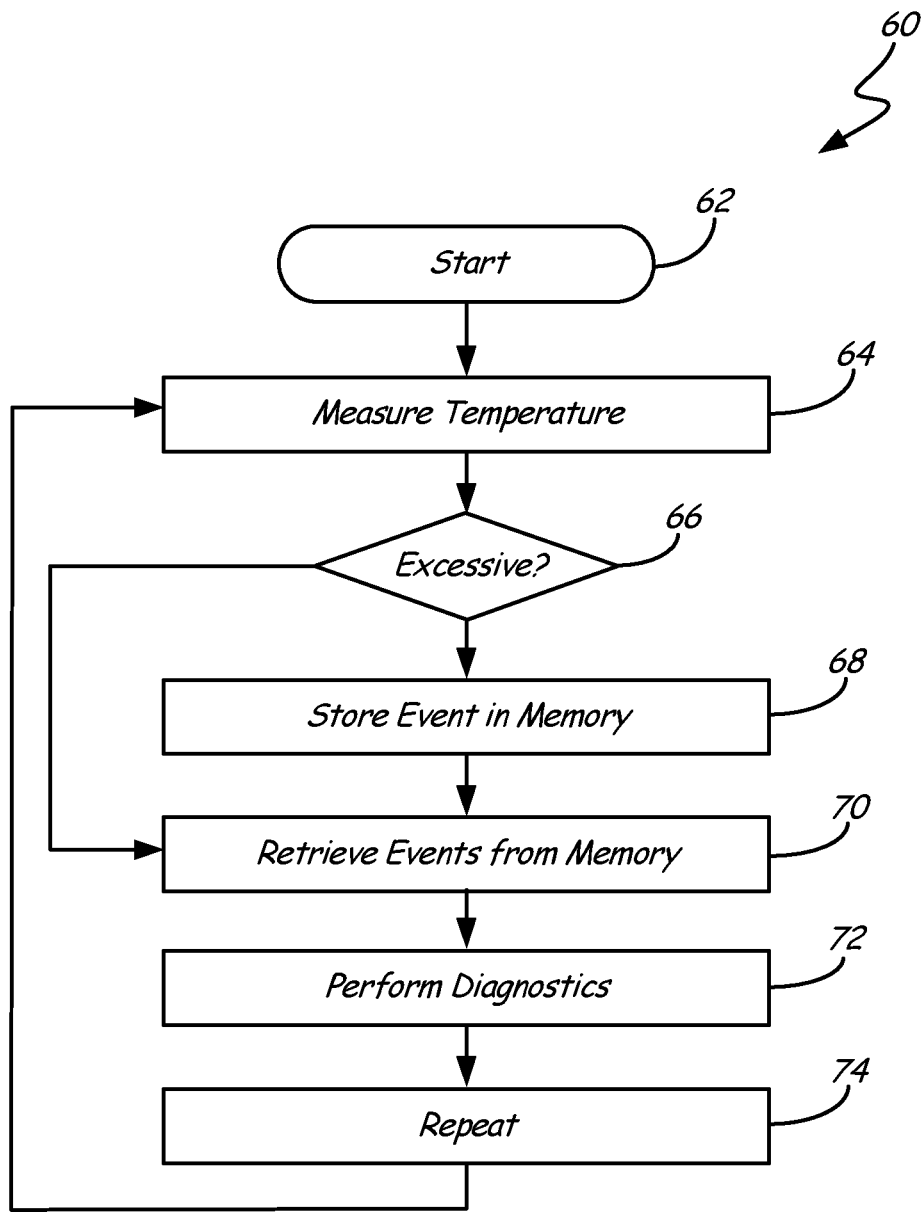
FIG. 3 is a simplified block diagram of steps in accordance with the present invention.

FIG. 3 is a simplified block diagram 60 showing steps in accordance with one embodiment of the present invention. The steps illustrated in FIG. 3 can be implemented using, for example, microprocessor 22 operating based upon instructions stored in memory 30. The procedure begins at block 62 and a temperature measurement is obtained at block 64. At block 66 a determination is made whether the sensor is experiencing an excessive temperature event. This can be by comparing the temperature to a threshold and may also factor in time in the determination of an excessive temperature event. If such event is or has occurred, excessive temperature event information is stored in memory 30 or 40 at block 68. If there is no excessive temperature event, control is passed to block 70. At block 70, excessive temperature events are retrieved from memory 30 or 40. At block 72, diagnostics are performed based upon the retrieved excessive temperature event information. In other configurations, at block 72 other types of steps may be performed including compensation of a measured temperature value based upon the retrieved excessive temperature events. Additionally, the excessive temperature event information retrieved from memory 30 or 40 can be transmitted to another location as desired over the process control loop 11.

Although the present invention has been described with reference to preferred embodiments, workers skilled in the art will recognize that changes may be made in form and detail without departing from the spirit and scope of the invention. As used herein, "measurement circuitry" and "diagnostic circuitry" are implemented in various components of the temperature transmitter. For example, both of the circuits can be implemented in the microprocessor 22 and may include other circuitry. For example, measurement circuitry may also include an analog to digital converter, amplifier, current source, etc. In other configurations, the circuitry may be spread among discrete elements, or may include shared elements.

What is claimed is:

1. A temperature transmitter for sensing a temperature of an industrial process, comprising:
   a temperature sensor arranged to provide a sensor output related to the temperature of the industrial process;
   measurement circuitry coupled to the temperature sensor configured to measure the temperature of the industrial process based upon the sensor output;
   output circuitry configured to provide an output related to the measured temperature;
   a memory configured to store temperature information related to excessive temperature events experienced by the temperature sensor due to heat from the industrial process; and
   diagnostic circuitry configured to diagnose a condition of the temperature sensor based upon the stored excessive temperature information.

2. The temperature transmitter of claim 1 wherein the memory is located in the temperature transmitter.

3. The temperature transmitter of claim 1 wherein the memory is coupled to the temperature sensor and the temperature sensor is removable from the transmitter.

4. The temperature transmitter of claim 1 wherein the excessive temperature information includes information related to a number of times the temperature sensor has experienced an excessive temperature event.

5. The temperature transmitter of claim 1 wherein the excessive temperature information includes information related to a duration during which the temperature sensor experienced an excessive temperature.

6. The temperature transmitter of claim 1 wherein the excessive temperature information includes a temperature experienced by the temperature sensor during an excessive temperature event.

7. The temperature transmitter of claim 1 wherein the condition diagnosed by the diagnostic circuitry relates to a remaining lifetime of the temperature sensor.

8. The temperature transmitter of claim 1 wherein the diagnosed condition of the temperature sensor relates to a predicted error in the measured temperature.

9. The temperature transmitter of claim 1 wherein the measurement circuitry compensates the measured temperature based upon the diagnosed condition.

10. The temperature transmitter of claim 1 wherein the temperature sensor comprises a Resistive Temperature Device (RTD).

11. The temperature transmitter of claim 1 wherein the temperature sensor comprises a Thermocouple.

12. A method of performing diagnostics on a temperature transmitter of the type used to sense a temperature of an industrial process, comprising:
   sensing the temperature of the industrial process using a temperature sensor and providing a sensor output related to the sensed temperature;
   measuring the temperature of the industrial process based upon the sensor output using measurement circuitry;
   providing an output related to the measured temperature;
   storing excessive temperature information in a memory, the excessive temperature information related to excessive temperature events experienced by the temperature sensor due to heat from the industrial process; and
   diagnosing a condition of the temperature sensor based upon the stored excessive temperature information.

13. The method of claim 12 wherein the memory is located in the temperature transmitter.

14. The method of claim 12 wherein the memory is coupled to the temperature sensor and the temperature sensor is removable from the temperature transmitter.

15. The method of claim 12 wherein the excessive temperature information includes information related to a number of times the temperature sensor has experienced an excessive temperature event.

16. The method of claim 12 wherein the excessive temperature information includes information related to a duration during which the temperature sensor experienced an excessive temperature.

17. The method of claim 12 wherein the excessive temperature information includes the temperature experienced by the temperature sensor during an excessive temperature event.

18. The method of claim 12 wherein the diagnosed condition of the temperature sensor relates to a remaining lifetime of the temperature sensor.

19. The method of claim 12 wherein the diagnosed condition of the temperature sensor relates to a predicted error in the measured temperature.

20. The method of claim 12 including compensating the measured temperature based upon the diagnosed condition.

* * * * *